United States Patent [19]
Maeda

[11] Patent Number: 5,337,303
[45] Date of Patent: Aug. 9, 1994

[54] DISK STORAGE DEVICE HAVING LIGHT RECEIVING DEVICE LOCATED AT IMPROVED POSITION

[75] Inventor: Miyozo Maeda, Kawasaki, Japan
[73] Assignee: Fujitsu Limited, Kawasaki, Japan
[21] Appl. No.: 19,837
[22] Filed: Feb. 19, 1993
[30] Foreign Application Priority Data
Feb. 27, 1992 [JP] Japan .................................. 4-041595
[51] Int. Cl.$^5$ .............................................. G11B 7/00
[52] U.S. Cl. .................. 369/112; 369/44.23; 369/107; 369/44.32
[58] Field of Search .................. 369/112, 44.23, 44.12, 369/44.38, 110, 121, 111, 44.41, 107, 44.32

[56] References Cited
U.S. PATENT DOCUMENTS

| 5,001,333 | 3/1991 | Marshall | 369/44.23 |
| 5,153,864 | 10/1992 | Ishika | 369/44.23 |
| 5,199,012 | 3/1993 | Imai | 369/44.41 |
| 5,235,581 | 8/1993 | Miyagawa et al. | 369/44.12 |

*Primary Examiner*—Paul M. Dzierzynski
*Assistant Examiner*—Kim-Kwok Chu
*Attorney, Agent, or Firm*—Armstrong, Westerman, Hattori & McLeland & Naughton

[57] ABSTRACT

A disk storage device includes a light source emitting a light, an objective lens for focusing the light on a surface of a recording film of a disk via a protection film protecting the recording film, and a motor for rotating the disk. A detector receives the light reflected by the surface of the recording film and reproduces information recorded on the recording film. The detector is located at a position where the following condition is satisfied:

$$D \geq F \times A \times \alpha$$

where D is the distance between the objective lens and the detector, F is the focal length of the objective lens, A is equal to F/t2 where t2 is the thickness of the protection film, and α is a constant equal to or greater than 1.0.

11 Claims, 9 Drawing Sheets

$$D = \frac{F}{t_2} \times F \times 1.5$$

DISK STORAGE DEVICE HAVING LIGHT RECEIVING DEVICE LOCATED AT IMPROVED POSITION

BACKGROUND OF THE INVENTION

1. Field of the Invention

The present invention generally relates to an optical disk storage device, such as an optical disk device or a magneto-optic disk device, and more particularly to an optical disk storage device in which light is projected onto a recording film via a protection film formed on the recording film.

2. Description of the Prior Art

An optical disk has a recording film formed on a substrate, and a protection film which covers the recording film. It will be noted that the term "optical disks" includes magneto-optic disks. Recently, an attempt to reduce the thickness of optical disk storage devices that use the optical disks described above has been made. For this purpose, it is necessary to diminish the dimensions of optical parts, such as objective lenses.

Figure 1:
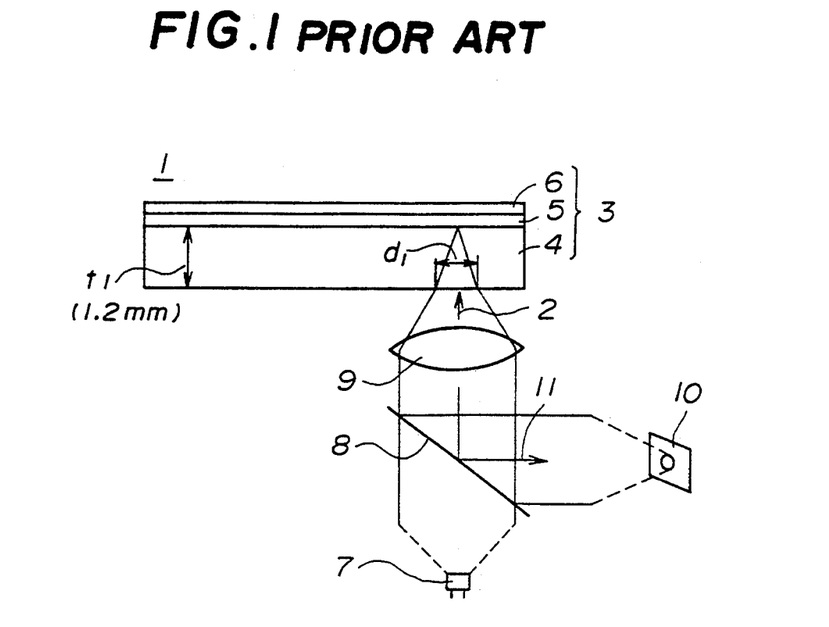
FIG. 1 is a schematic diagram of a conventional optical disk storage device.

FIG. 1 illustrates a conventional optical disk storage device 1. A laser beam 2 is projected onto an optical disk 3 at the side of a base 4 thereof. A recording film 5 is formed on the base 4, and a protection film 6 is formed on the recording film 5. An optical system includes a semiconductor laser 7, a beam splitter 8, an objective lens Q, and a photodetector 10. The laser beam 2 emitted from the semiconductor laser 7 passes through the beam splitter 8 and is focused on the recording film 5 by the objective lens 2. The laser beam 2 is reflected by the recording film 5, and passes through the objective lens 9. Then, the reflected laser beam is reflected by the beam splitter 8, and is protected onto the photodetector 10. The photodetector 10 converts the received light into a corresponding electric signal. In this manner, information recorded on the optical disk 3 can be reproduced.

The laser beam 2 through the objective lens g is refracted at the surface of the base 4, and passes therethrough. Normally, the base 4 is thick. For example, the thickness t1 of the base is 1.2 mm. The size d1 of a light spot formed on the surface of the base 4 needs to be large enough to focus the laser beam 2 on the surface of the recording film 5. Hence, it is necessary to use a large size of objective lens 9 and a large size of beam splitter 8. As a result, with the structure shown in FIG. 1, it is very difficult to reduce the dimensions of the optical parts and hence produce thin optical disk storage devices.

Figure 2:
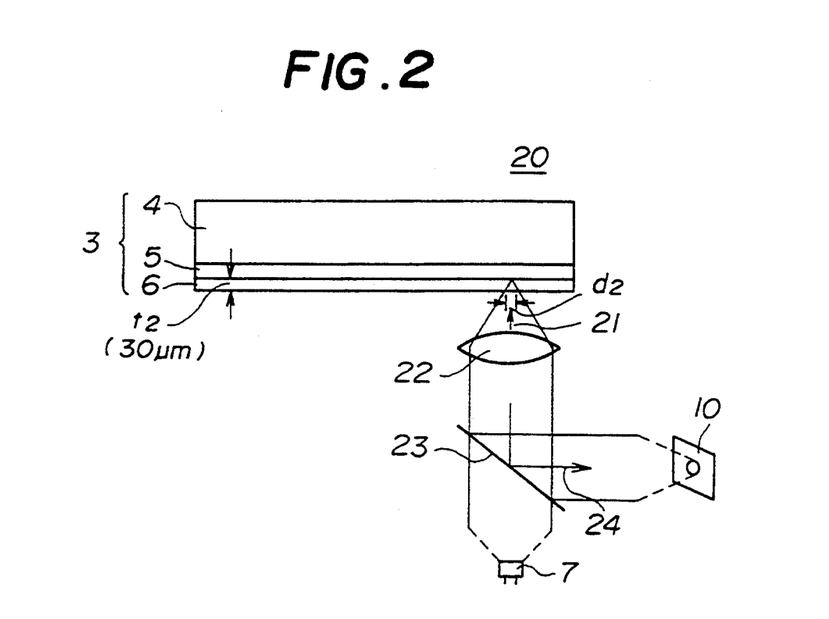
FIG. 2 is a schematic diagram of an optical disk storage device designed to eliminate disadvantages of the conventional disk storage device shown in FIG. 1.

In order to eliminate the above-described disadvantages, an improved optical disk storage device 20 as shown in FIG. 2 can be made. A laser beam 21 is projected onto the optical disk 3 from the side of the protection film 6. The laser beam 21 emitted from the semiconductor laser 7 passes through a beam splitter 23, and is converged by an objective lens 22. The converged laser beam 21 passes through the protection film 6, and is projected onto the recording film 5. Then, the laser beam 21 is reflected by the surface of the recording film 5, and is projected onto the photodetector 10 via the objective lens 22 and the beam splitter 23. The laser beam 21 is refracted at the surface of the protection film 6.

Normally, the thickness t2 of the protection film 6 is approximately 30 μm, and is much less than the thickness t1 of the base 4. Hence, the size d2 of the light spot on the surface of the protection film 6 is far less than the spot size d1 shown in FIG. 1. As a result, it is possible to use an objective lens 22 of a smaller size and a beam splitter 23 of a smaller size. Hence, the optical disk storage device 20 can be made more compact than the optical disk storage device 1. In addition, a large tolerance for the inclination of the optical disk 3 can be obtained because the laser beam 22 is refracted at the surface of the thin protection film 6 and then travels a very short optical distance to reach the recording film 5.

Figure 3A:
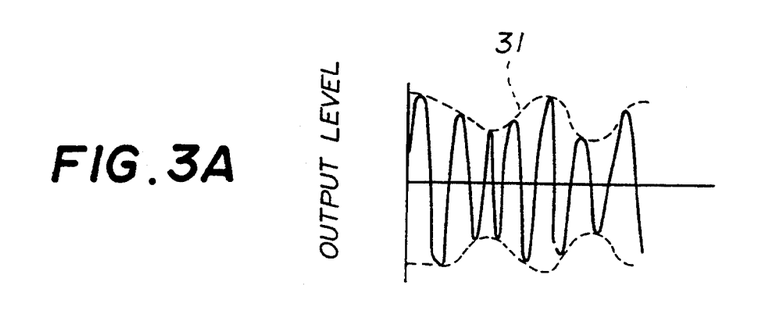
FIGS. 3A and 3B are waveform diagrams illustrating the disadvantage of the optical disk storage device shown in FIG. 2.
Figure 3B:
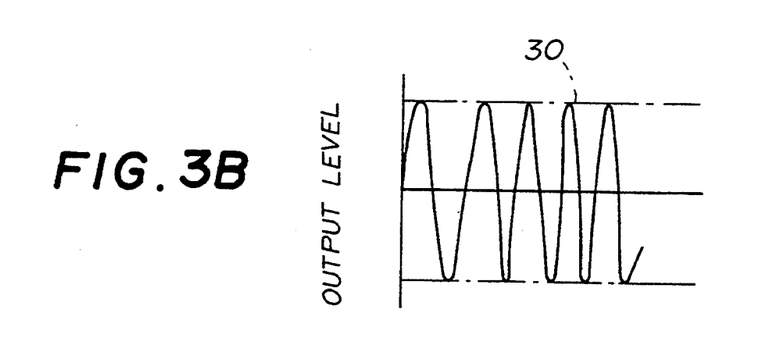

The inventors of the present invention found a disadvantage of the optical disk storage device 20 shown in FIG. 2 through experiments. The inventors studied the relationship between the position of the photodetector 10 and the reproduced information signal output from the photodetector 10. When the photodetector 10 is located at an appropriate position, the photodetector 10 generates an output signal 30 shown in FIG. 3B. The output signal 30 shown in FIG. 3B has an approximately constant envelope. When the photodetector 10 is located at an inappropriate position, the photodetector 10 generates an output signal 31 shown in FIG. 3A. The envelope of the output signal 31 varies due to interference between the laser beam reflected by the surface of the recording film 5 and the laser beam reflected by the surface of the protection film 6.

In the prior art, there is no consideration given to the above problem.

SUMMARY OF THE INVENTION

It is a general object of the present invention to provide an optical disk storage device in which the above disadvantage is eliminated.

A more specific object of the present invention is to provide an optical disk storage device capable of generating a reproduced signal having little variation in the envelope thereof.

The above objects of the present invention are achieved by a disk storage device comprising: a light source emitting a light; an objective lens for focusing the light on a surface of a recording film of a disk via a protection film protecting the recording film; detector means, optically coupled to said light source and the objective lens, for receiving the light reflected by the surface of the recording film and for reproducing information recorded on the recording film; and driving means for rotating the disk. The detector means is located at a position where the following condition is satisfied:

$$D \geq F \times A \times \alpha$$

where D is the distance between the objective lens and the detector means, F is the focal length of the objective lens, A is equal to $F/t2$ where $t2$ is a thickness of the protection film, and $\alpha$ is a constant equal to or greater than 1.0.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

Figure 4:
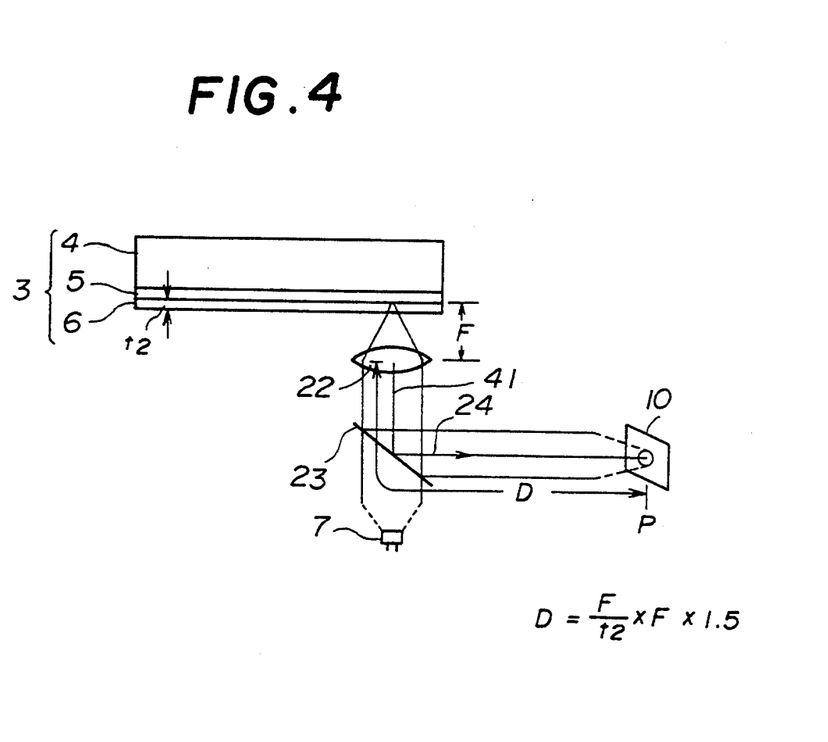
FIG. 4 is a schematic diagram illustrating an outline of the disk storage device according to the present invention.

FIG. 4 shows an outline of the disk storage device according to the present invention. In FIG. 4, parts that are the same as parts shown in the previously described figures are given the same reference numbers.

The photodetector 10 is located at a position P, which is determined as follows. It will now be assumed that F denotes the focal length of the objective lens 22, t2 denotes the thickness of the protection film 6, and D denotes the optical distance between the objective lens 22 and the photodetector 10 measured along an optical path 41 of a reflected laser beam 24. Further, A is defined as follows:

$$F/T2 = A.$$

The position P is determined so that the distance D is equal to or greater than the product of F and A, that is, $$D \geq F \times A \tag{1}$$

When $D = F \times A$, the following equation is satisfied:

$$(t2/F)/(F/D) = 1.$$

When the position P is selected so that the condition (1) is satisfied, there is little interference between the laser beam reflected by the surface of the recording film 5 and the laser beam reflected by the surface of the protection film 6.

Figure 5:
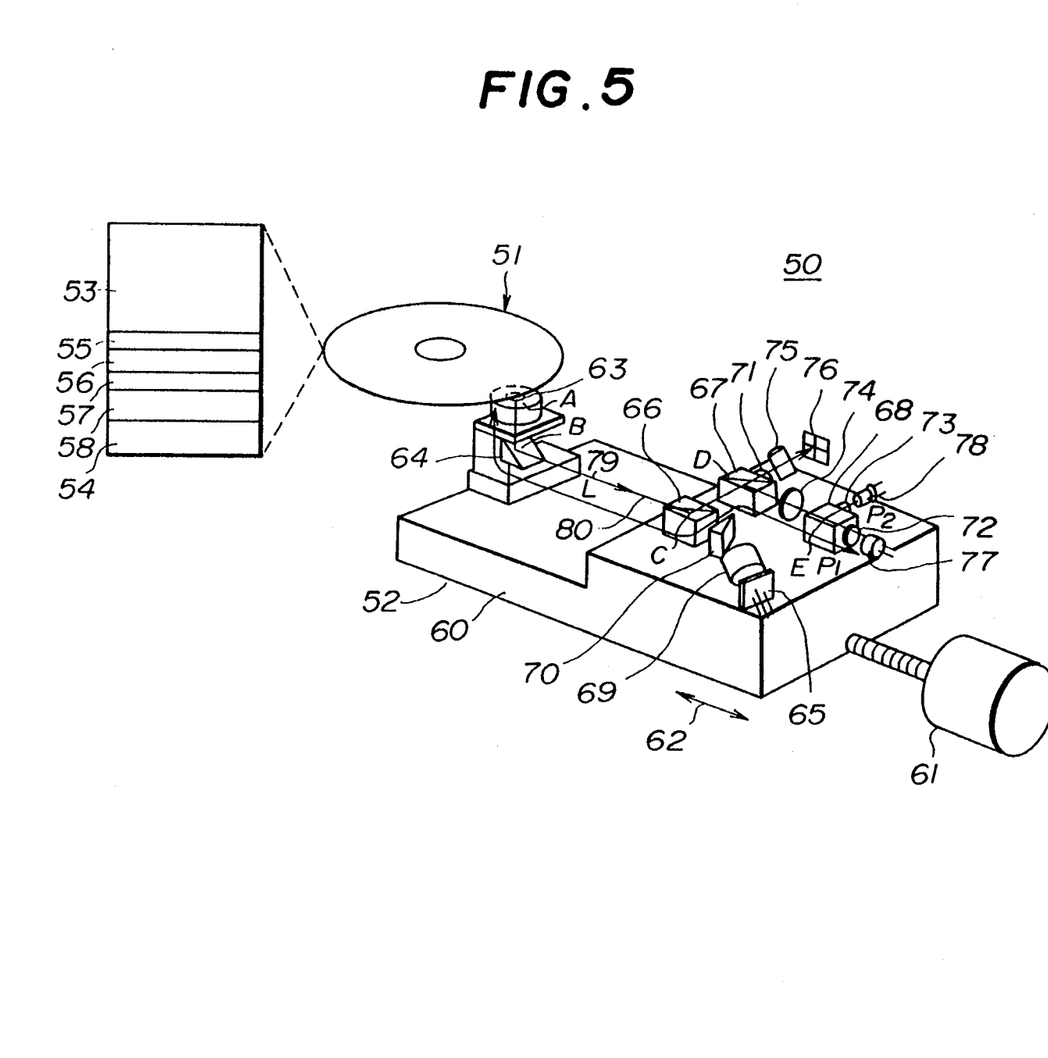
FIG. 5 is a perspective view of a magneto-optic disk storage device according to an embodiment of the present invention.

FIG. 5 is a perspective view of a magneto-optic disk storage device 50 according to an embodiment of the present invention. The device 50 records information on a magneto-optic disk 51 and reads information therefrom. An optical head device 52 is positioned below the magneto-optic disk 51. As shown in FIG. 5, the magneto-optic disk 51 is fastened to a shaft of a motor 63 so that a protection film 54 faces the optical head device 52, and a substrate 53 made of polycarbonate faces upwards. In addition to the substrate 53 and the film 54, the magneto-optical disk 51 includes a reflection film 55, a composite protection film 56, a recording film 57 and a composite protection film 58. The reflection film 55 is made of aluminum, and is 50 nm thick. The composite protection film 56 is made of Tb-SiO$_2$ and is 35 nm thick. The recording film 57 is made of a magnetic material, such as TbFeCo, and has a thickness of 30 nm. The composite protection film 58 is made of Tb-SiO$_2$, and is 80 nm. The protection film 54 is formed by coating photopolymer resin (2P) by a spin-coat process. The thickness t2 of the protection film 54 is 20 $\mu$m in an inner portion thereof, and is 40 $\mu$m in an outer portion. The average thickness of the protection film 54 is 30 $\mu$m.

The optical head device 52 has the following structure. Optical parts of the head device 52 are mounted on a carriage 60. A stepping motor 61 moves the carriage 60 in its radial direction of the magneto-optic disk 51. The optical head device 52 includes an objective lens 63, a mirror 64, a semiconductor laser 65, beam splitters 66 and 67, and a polarized beam splitter 68. Further, the optical head device 52 includes a collimator lens 69, a complete-round correction prism 70, condenser lenses 71, 72 and 73, a ½ wavelength plate 74, a cylindrical lens 75, and a four-divided photodetector 76 for detecting a servo signal. When information is reproduced from an optical disk rather than the magneto-optic disk 51, an information signal can be reproduced by the four-divided photodetector.

Further, photodetectors 77 and 78 for generating reproduced signals from received laser beams are respectively located at positions P1 and P2 so that they face the beam splitter 68. As will be described later, the photodetectors 77 and 78 are positioned according to the present invention.

A laser beam emitted from the semiconductor laser 65 passes through the lens 69, the prism 70 and the beam splitter 66 in that order, and is reflected by the mirror 64 so that the laser beam travels toward the disk 51. The laser beam reflected by the mirror 64 is condensed by the objective lens 63, and is focused on the surface of the recording film 57 via the protection film 54. A laser beam 79 reflected by the recording film 57 passes through the objective lens 63, the mirror 64, the beam splitter 66 and the beam splitter 7, and reaches the detector 76. Some of the laser beam 79 is directed by the beam splitter 67 to the polarizing beam splitter 68, which branches the received laser beam 79 into two beams respectively directed to the photodetectors 77 and 78. The photodetectors 77 and 78 generate the reproduced information signals from the respective signals received from the beam splitter 68.

In the structure shown in FIG. 5, the thickness t2 of the protection film is 30 $\mu$m, and the focal length F of the objective lens 63 is 3 mm. The distance D between the position A of the objective lens 63 and the position P1 (P2) via positions B, C, D and E is approximately 450 mm. That is, the photodetectors 77 and 78 are located at the positions P1 and P2 which are 450 mm away from the objective lens 63.

In the above case, the aforementioned A is calculated as follows:

$$A = F/t2 = 100.$$

The distance 450 mm is 1.5 times the product A×F (=300). For 450 mm, (T2/F)/(F/D)=1.5.

Figure 6:
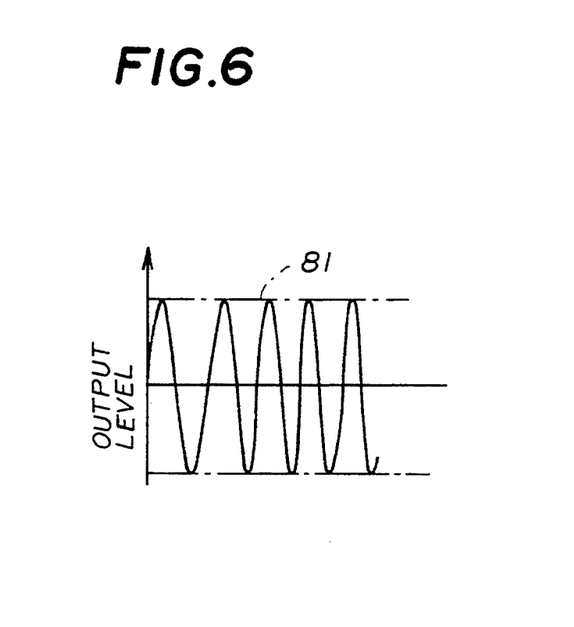
FIG. 6 is a waveform diagram of a reproduced signal obtained by the device shown in FIG. 5.

Under the above condition, a reproduced signal shown in FIG. 6 was obtained. It will be noted that there is no distortion in the waveform of the reproduced signal. That is, the reproduced signal has a constant envelope 81.

Figure 7:
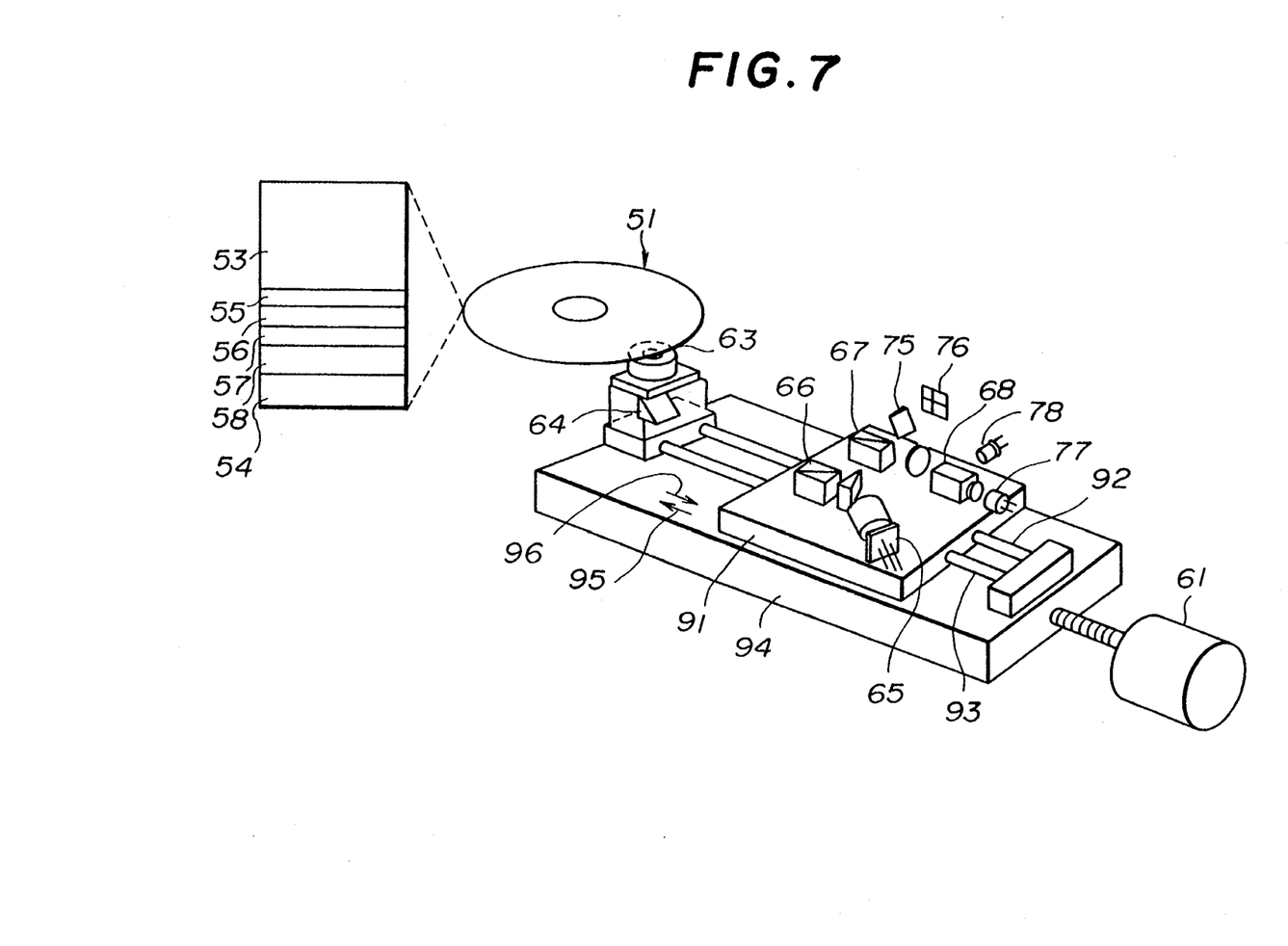
FIG. 7 is a perspective view of an experimental device used to investigate distortion of the reproduced signal.
Figure 8:
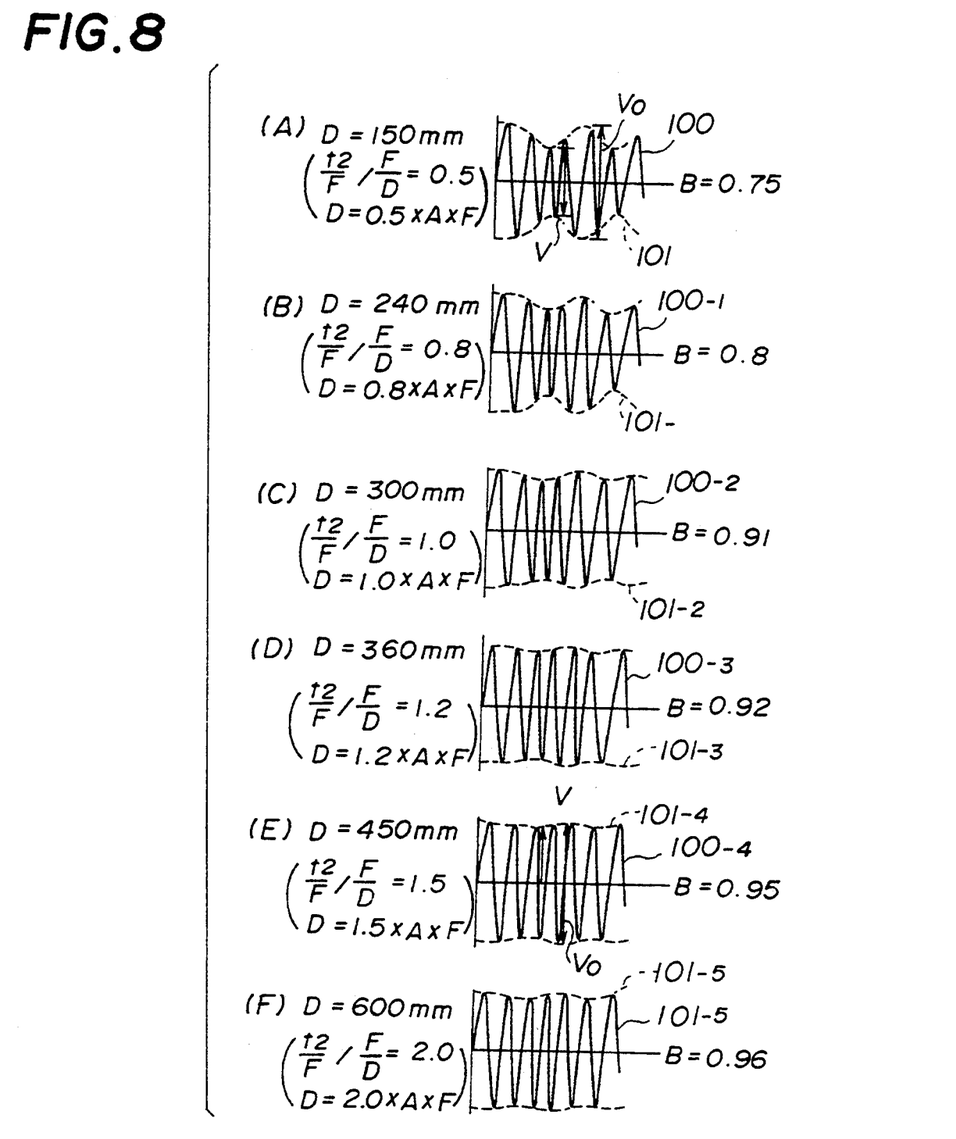
FIG. 8A–8F are waveform diagrams illustrating reproduced signals obtained by the experimental device shown in FIG. 7.

In order to investigate the relationship between the distortion of the reproduced signal and the distance D, an experiment was conducted using an experimental device 90 shown in FIG. 7, in which parts that are the same as parts shown in FIG. 5 are given the same reference numbers. The device 90 includes a table 91 on which the beam splitters 66 and 67, the deflection beam splitter 68, and the photodetectors 77 and 78 are located. The table 91, which is mounted on a slidable carriage 94, is movable in the directions indicated by arrows 95 and 96 in such a manner that the table 91 is guided by guide rods 92 and 93. When the table 91 is moved in the direction indicated by the arrow 95, the distance D decreases. When the table 91 is moved in the direction indicated by the arrow 96, the distance D increases.

The magneto-optical disk 51 was placed in position, and the table 91 was brought near to the mirror 64 so that the distance D was 150 mm. Then, the table 91 was fixed at that position. In this state, a reproduced signal 100 shown in FIG. 8-(A) was observed. Reference number 101 indicates the envelope of the reproduced signal 100. Next, the distance between the mirror 64 and the disk 51 was increased and the table 91 was fixed at a position where the distance D is 240 mm. In this state, a reproduced signal $100_1$ having an envelope $101_1$ shown in FIG. 8-(B) was observed. Then, the table 91 was moved in the direction indicated by the arrow 96 and fixed at a position where the distance D is 300 mm. In this state, a reproduced signal $100_2$ having an envelope $101_2$ shown in FIG. 8-(C) was observed. Thereafter, the table 91 was moved and fixed at a position where the distance D is 360 mm. In this state, a reproduced signal $100_3$ having an envelope $101_3$ shown in FIG. 8-(D) was observed. Then, the table 91 was moved and fixed at a position where the distance D is 450 mm. In this state, a reproduced signal $100_4$ having an envelope $101_4$ shown in FIG. 8-(E) was observed. Further, the table 91 was moved and fixed at a position where the distance D is equal to 600 mm. In this state, a reproduced signal $100_5$ having an envelope $101_5$ shown in FIG. 8-(G) was observed.

The degree of distortion of the envelope of the reproduced signal will now be studied. It will now be assumed that the distortion B of the envelope is written as follows:

$$B = V/V_o$$

where V denotes the minimum amplitude of the reproduced signal and Vo denotes the maximum amplitude thereof.

Figure 9:
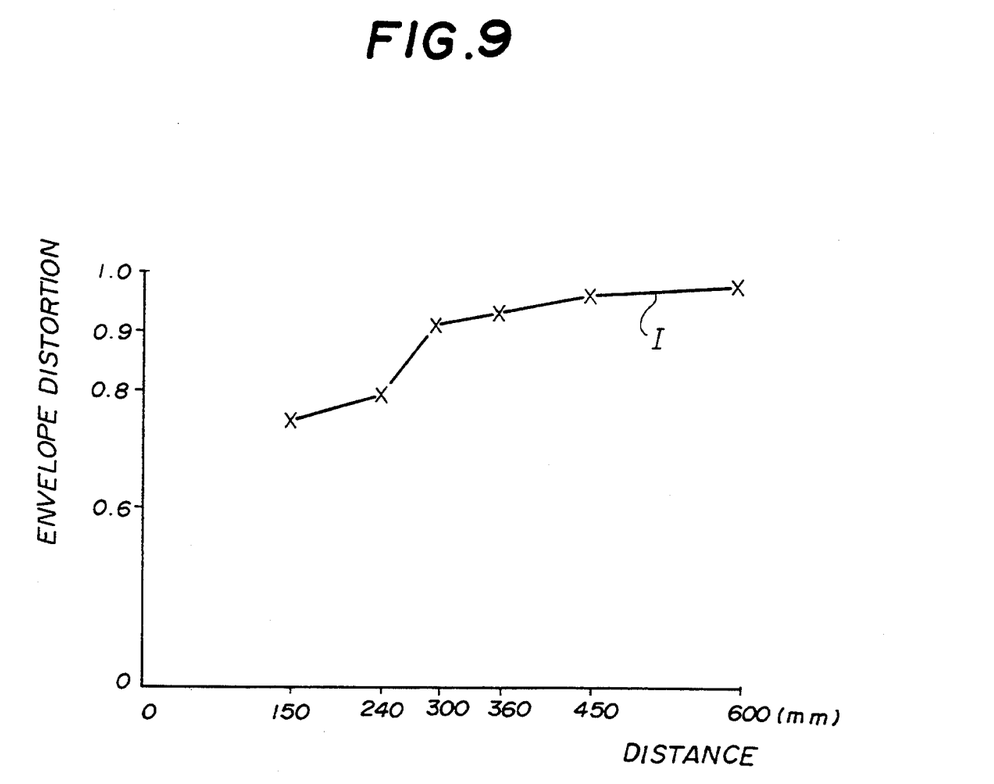
FIG. 9 is a graph showing the relationship between an envelope distortion and the distance between an objective lens and a photodetector.

The relationship between the envelope distortion B and the distance D is illustrated by line I shown in FIG. 9. It can be seen from FIG. 9 that a large distortion of the envelope is observed when the distance D is small and a small distortion is observed when the distance D is large. When the tolerable value of the envelope distortion B is 0.9, the distance D must be equal to or longer than 300 mm. In other words, reproduced signals having distortions equal to or less than the tolerable value (=0.9) can be obtained when the photodetectors 17 and 78 are located at positions where the respective distances L are equal to or greater than 300 mm.

The distance D depends on the focal length F of the objective lens 36 and the thickness t2 of the protection film 54. The relationship among the distance D, the focal length F and the thickness t2 can be expressed by a general expression in the following way.

Figure 10A:
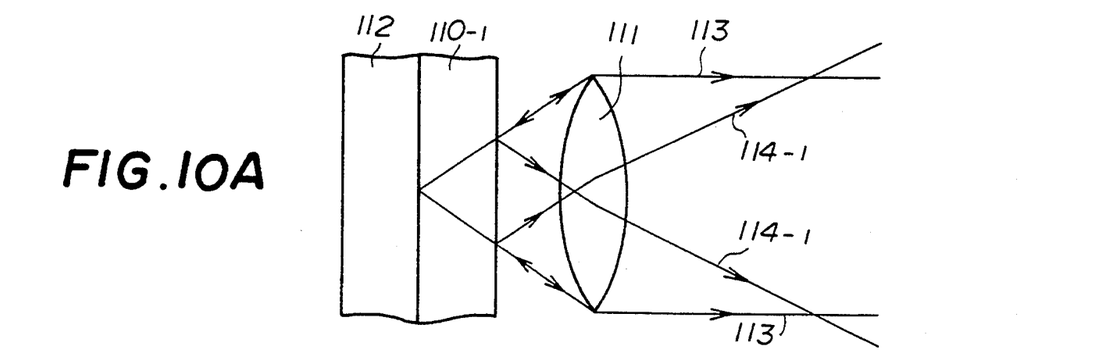
FIGS. 10A, 10B and 10C illustrate the relationship between the thickness of a protection film and the degree of diffusion of reflected light.
Figure 10B:
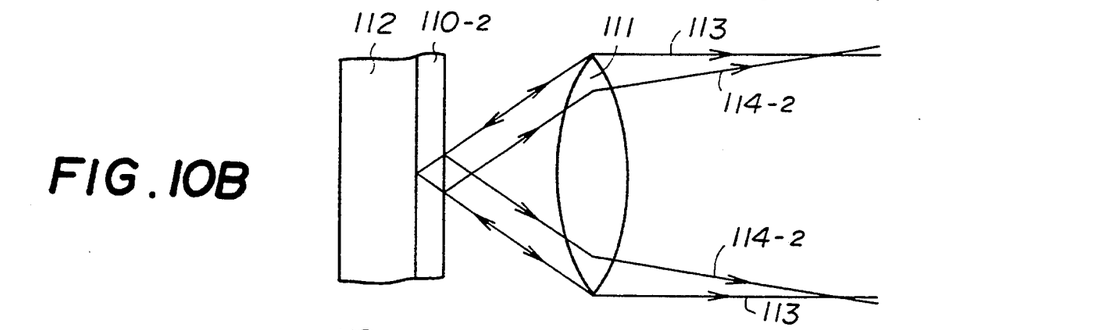
Figure 10C:
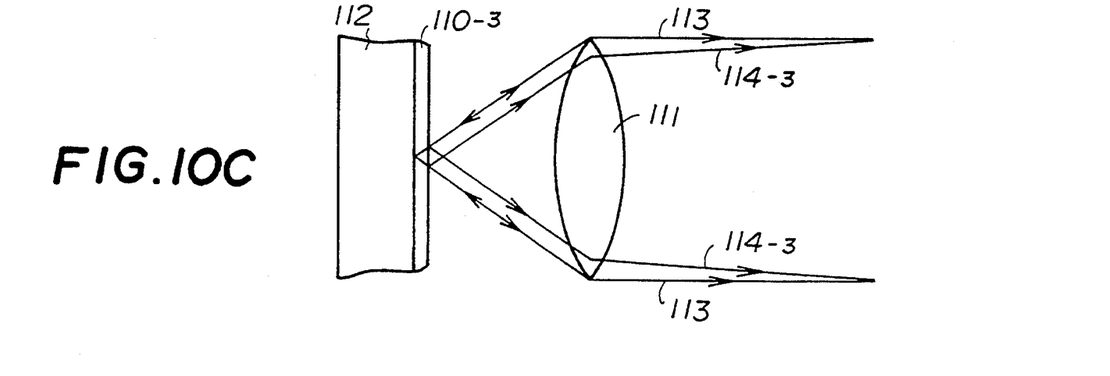

FIGS. 10A, 10B and 10C illustrate light beams reflected by the surface of a recording film 112 and the surfaces of respective protection films $110_1$, $110_2$ and $110_3$. FIG. 10A shows the protection film $110_1$ having a thickness greater than the thickness of the protection film $110_2$ shown in FIG. 10B. The protection film $110_2$ is thicker than the protection film $110_3$. That is, $t10 > t11 > t12$ where t10, t11 and t12 are the thicknesses of the protection films $110_1$, $110_2$ and $110_3$, respectively.

In FIGS. 10A, 10B and 10C, a laser beam is condensed by an objective lens 111, and is focused on the surface of the recording film 112. Then, the laser beam is reflected by the surface of the recording film 112 and is collimated by the objective lens 111. The collimated beam is indicated by reference number 113.

In FIGS. 10A, 10B and 10C, the incoming laser beams are reflected by the surfaces of the protection films $110_1$, $110_2$ and $110_3$ are diffused objective lens 111. The laser beams reflected by the protection films $110_1$, $110_2$ and $110_3$ are diffused light beams. The degree of diffusion increases as the protection film becomes thicker. When the thickness of the protection film is approximately 30 μm, the degree of diffusion is considerable small, and the reflected laser beam from the lens 111 is substantially the collimated beam.

The inventors considered that there is interference between the laser beam reflected by the surface of the recording film 112 and the laser beam reflected by the surface of the protection film 110 and that envelope distortion is caused by the interference.

The effect of diffusion on the photodetector 77 (78) was studied. The relationship between the thickness t2 of the protection film and the focal length F of the objective lens is such that the degree of diffusion decreases as the thickness t2 decreases with the focal length F fixed at a constant value. The relationship between the focal length F and the distance D is such that the degree of diffusion increases as the distance D increases with the focal length F fixed at a constant value.

From the above consideration, the degree of diffusion at the photodetector 77 (78), that is, the degree of interference, can be written as the following general expression:

$$(t2/F)/(F/D).$$

Figure 11:
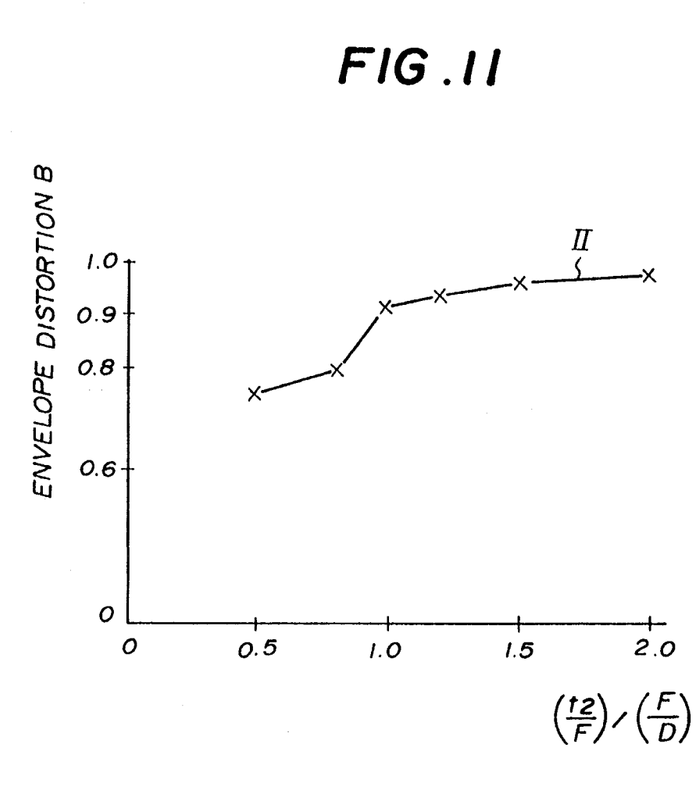
FIG. 11 is a graph showing the relationship between the envelope distortion and predetermined parameters.

FIG. 11 is a graph illustrating the relationship between the envelope distortion B and (t2/F)/(F/D). The above relationship is indicated by line II in FIG. 11. It can be seen from the graph of FIG. 11 that the photodetectors 77 and 78 should be located so that (t2/F)/(F/D) is equal to or greater than 1.0, preferable, equal to or greater than 1.5. Assuming that F/t2=A, the expression (t2/F)/(F/D)=1.0 can be written as follows:

$$D = (F^2/t2) \times 1.0 = F \times A \times 1.9.$$

Similarly, the expression $(t2/F)/(F/D)=1.5$ can be written as follows:

$$D=(F^2/t2)\times 1.5 = F\times A\times 1.5.$$

Hence, in general, it is required that the condition $D \geq F\times A\times \alpha$ be satisfied where $\alpha \geq 1.0$.

If it is necessary to reduce the distance D, it is necessary to increase the thickness t2 of the protection film.

The present invention is not limited to the specifically disclosed embodiment, and variations and modifications may be made without departing from the scope of the present invention.

What is claimed is:

1. A disk storage device comprising:
   a light source emitting a light;
   an objective lens for focusing the light on a surface of a recording film of a disk so that the light passes only through a protection film protecting the recording film;
   detector means, optically coupled to said light source and the objective lens, for receiving the light reflected by the surface of the recording film and for reproducing information recorded on the recording film; and
   driving means for rotating the disk,
   said detector means being located at a position P away from a beam splitter to satisfy the following condition:

$$D \geq F\times A\times \alpha$$

where D is the distance of the light path from the objective lens to the detector means, F is a focal length of the objective lens, A is equal to F/t2 where T2 is a thickness of the protection film, and $\alpha$ is a constant equal to or greater than 1.0.

2. The disk storage device as claimed in claim 1, wherein said detector means comprises a photodetector located at a position where the condition is satisfied.

3. The disk storage device as claimed in claim 1, wherein said detector means comprises a plurality of photodetectors located at respective positions where the condition is satisfied.

4. The disk storage device as claimed in claim 1, further comprising a beam splitter provided between the light source and the objective lens.

5. The disk storage device as claimed in claim 1, wherein the protection film is formed on the recording film.

6. The disk storage device as claimed in claim 1, wherein the disk is an optical disk.

7. The disk storage device as claimed in claim 1, wherein the disk is a magneto-optic disk.

8. An optical system comprising:
   a light source emitting a light;
   an objective lens for focusing the light on a surface of a recording film of a disk so that the light passes only through a protection film protecting the recording film; and
   detector means, optically coupled to said light source and the objective lens, for receiving the light reflected by the surface of the recording film and for reproducing information recorded on the recording film,
   said detector means being located at a position P away from a beam splitter to satisfy the following condition:

$$D \geq F\times A\times \alpha$$

where D is the distance of the light path from the objective lens to the detector means, F is a focal length of the objective lens, A is equal to t2/F where T2 is a thickness of the protection film, and $\alpha$ is a constant equal to or greater than 1.0.

9. The optical system as claimed in claim 8, wherein said detector means comprises a photodetector located at a position where the condition is satisfied.

10. The optical system as claimed in claim 8, wherein said detector means comprises a plurality of photodetectors located at respective positions where the condition is satisfied.

11. The optical system as claimed in claim 8, further comprising a beam splitter provided between the light source and the objective lens.

* * * * *